Nov. 19, 1946.  B. C. BOECKELER  2,411,186
PROCESS FOR RELEASING GASES FROM LIQUIDS
Filed Nov. 27, 1941   3 Sheets-Sheet 1
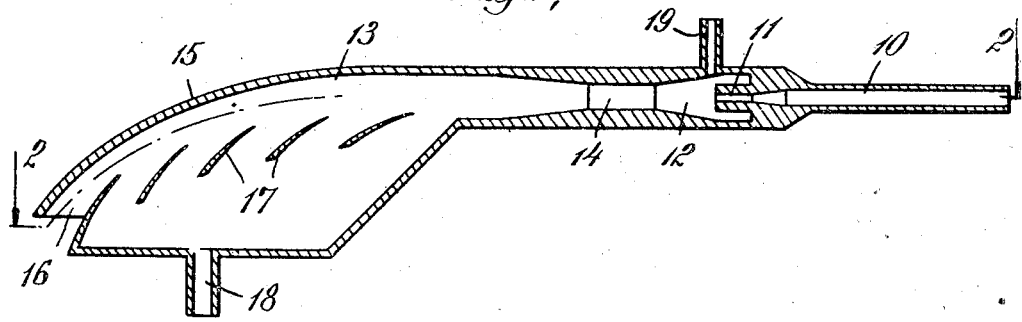
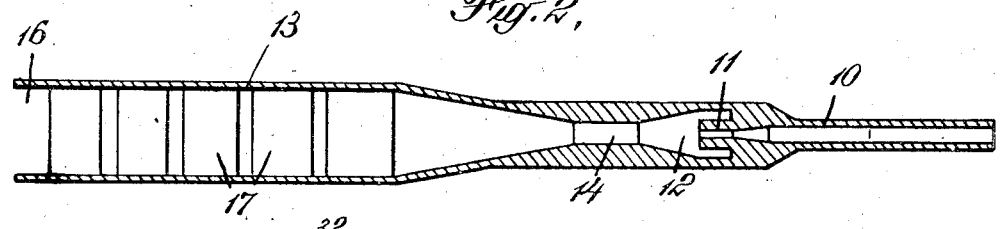
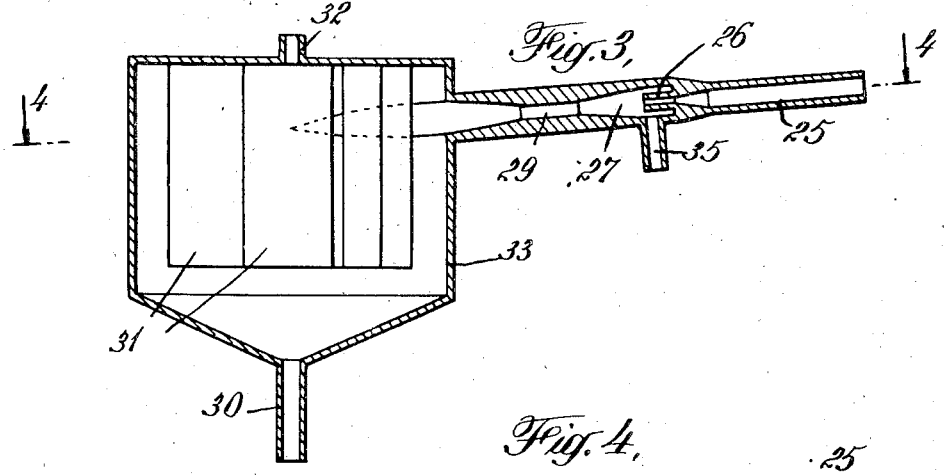
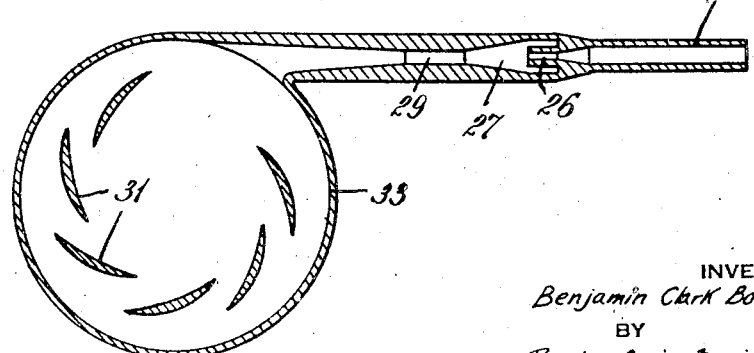
INVENTOR
Benjamin Clark Boeckeler
BY
Pennie Davis Marvin & Edmonds
ATTORNEYS Nov. 19, 1946.  B. C. BOECKELER  2,411,186
PROCESS FOR RELEASING GASES FROM LIQUIDS
Filed Nov. 27, 1941  3 Sheets-Sheet 2
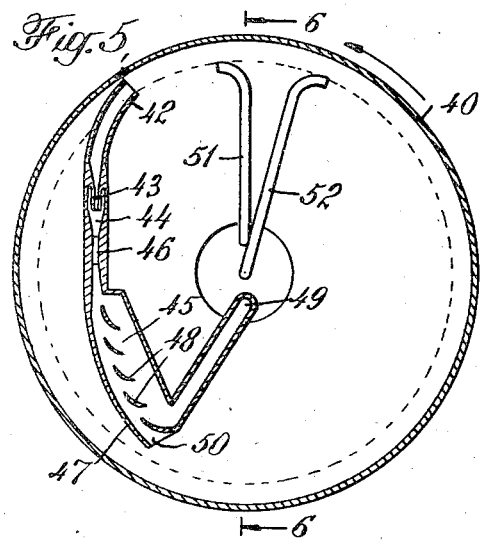
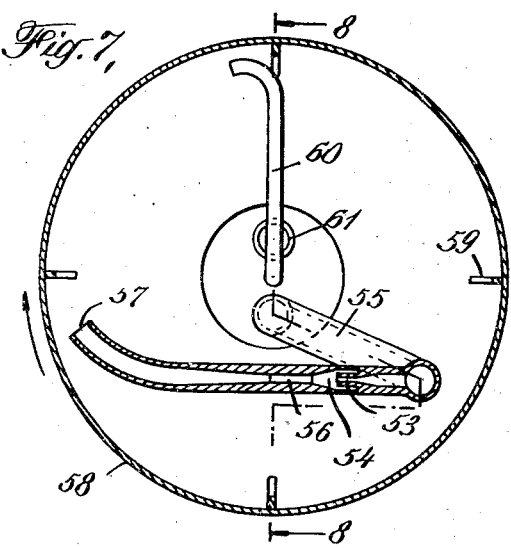
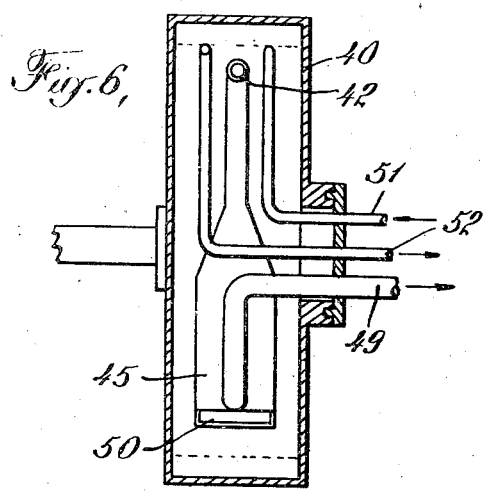
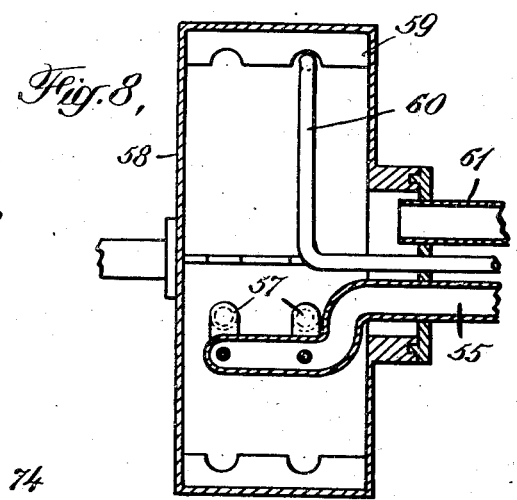
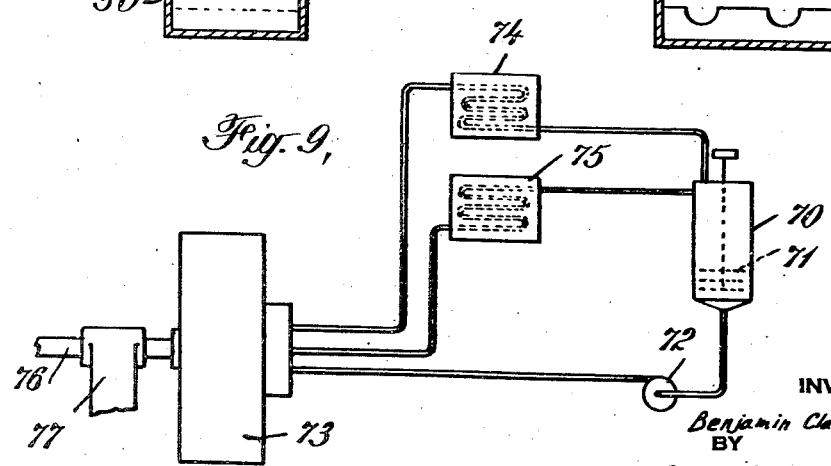
INVENTOR
Benjamin Clark Boeckeler
BY
ATTORNEYS Nov. 19, 1946.  B. C. BOECKELER  2,411,186
PROCESS FOR RELEASING GASES FROM LIQUIDS
Filed Nov. 27, 1941   3 Sheets-Sheet 3
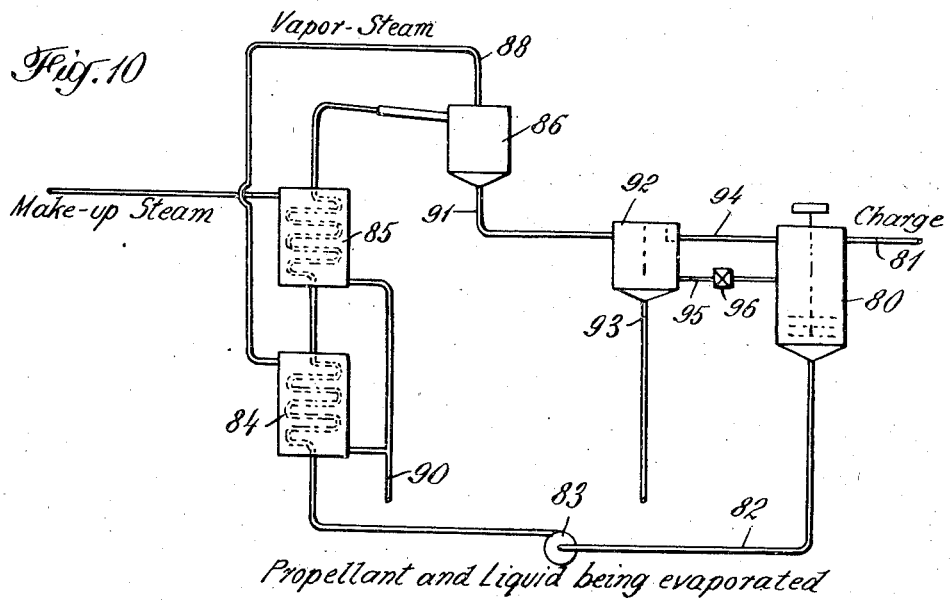
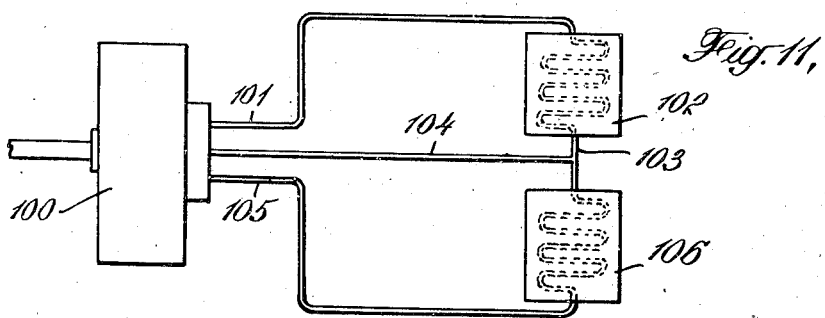
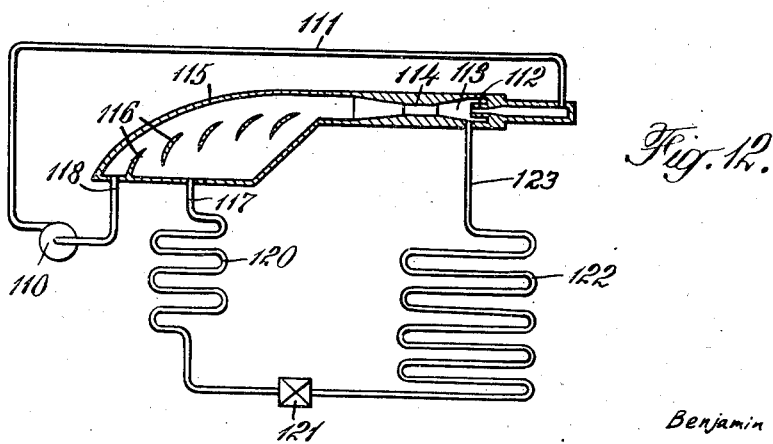
INVENTOR
Benjamin Clark Boeckeler
BY
ATTORNEYS

UNITED STATES PATENT OFFICE 2,411,186

PROCESS FOR RELEASING GASES FROM LIQUIDS

Benjamin Clark Boeckeler, Riverside, Conn., assignor to The Hydrojet Corporation, Wilmington, Del., a corporation of Delaware Application November 27, 1941, Serial No. 420,739

7 Claims. (Cl. 159—47)

This invention relates to the release of gases from liquids, e. g., by evaporation, and includes a new process of releasing gases from liquids by means of which liquids may be readily evaporated, or by which gases absorbed in liquids may be separated and recovered from the liquids.

In the usual evaporation procedures the vapor separated from the liquid is at the same temperature as the liquid and the heat in the vapor therefore cannot be used to aid in the further evaporation of the liquid without either recompressing the vapors to a higher condensing temperature as, for example, by the use of an external compressor, or using the vapors to heat a liquid boiling at a lower temperature, for example, liquid under reduced pressure in a subsequent effect in a multi-effect evaporator. In accordance with the process of this invention the evaporation occurs at reduced pressure, and the vapors are immediately and instantaneously compressed and then immediately and instantaneously separated from the unevaporated liquid before substantial condensation of the vapors occurs. Condensation of the vapors then occurs at an elevated pressure, thus making possible the recovery and reuse of the heat carried by the vapor.

In some instances it is desirable to evaporate a liquid without increasing the temperature, either because of chemical reaction, or decomposition, or other factors. It has been proposed to accomplish such a result by carrying out the evaporation at reduced pressure, but very frequently the condensing point of the vapors is below the temperature of the cooling water which is available and it therefore becomes necessary to resort to refrigeration. In the process of this invention the evaporation may be effected at reduced pressure and condensation may be accomplished at atmospheric or elevated pressures and consequently the heat in the vapors may be reused without the necessity of refrigerating equipment.

The process of this invention may be applied to the concentration or evaporation of various kinds of fluids and is adapted to be used in connection with refrigeration systems.

The process may also be applied with advantage to the recovery of gases from liquids in which they are absorbed.

The process of releasing gases from liquids in accordance with this invention comprises reducing the pressure on the liquid whereby gases will be released from the liquid, compressing the released gases substantially instantaneously in the presence of a liquid and thereafter rapidly separating the gases from the liquid. The separation of the compressed gases from the liquid should be accomplished sufficiently rapidly so that no substantial condensation or re-absorption of the gases will occur.

In evaporating liquids in accordance with this process, the pressure on the liquid to be evaporated is reduced whereby at least a part of the liquid will flash into vapor. The vapor is then compressed substantially instantaneously and is thereafter rapidly separated from the unvaporized liquid before substantial condensation of the vapor can occur. Advantageously the process may be conducted by passing a high velocity stream of the liquid to be vaporized into a reduced pressure region where a part of the liquid will be flashed into vapor substantially instantaneously; the vapor formed is compressed by and entrained in the stream of unvaporized liquid and is thereafter rapidly separated from the liquid. The rapid separation of entrained vapors from the unvaporized liquid may be accomplished by any suitable means, and may advantageously be effected by changing the direction of the stream so that liquid will be thrown outwardly and vapors inwardly, e. g., by the action of centrifugal force.

The evaporation of liquids in accordance with the process of this invention may be conducted with particular advantage by the use of a relatively non-volatile propellant liquid which acts as a carrier for the liquid which is to be evaporated. In accordance with this procedure a high velocity stream of a mixture of the propellant liquid and the liquid to be evaporated is subjected to reduced pressure, whereby at least a part of the liquid to be evaporated will flash into vapor. The vapor formed is compressed and entrained in the stream of unvaporized liquid and is thereafter rapidly separated from the unvaporized liquid.

The propellant fluid may be either miscible or immiscible with the liquid which is to be evaporated. If an immiscible propellant fluid is used the two liquids should be thoroughly agitated beforehand so that the liquid to be evaporated will be substantially dispersed in the propellant fluid.

To facilitate the rapid separation of the entrained vapor from the stream of unvaporized liquid it may be advantageous when vaporizing certain liquids to retard condensation or absorption by introducing a non-condensable gas into the reduced pressure region where the liquid to be evaporated is flashed into vapor. The passage of the stream of unvaporized liquid through this reduced pressure region will compress and entrain the non-condensable gas as well as the vapors of the liquid and thereafter the gas and vapor are rapidly separated from the liquid in the vapor-separating chamber. The non-condensable gas and the vapor may subsequently be separated by cooling them to a temperature at which the vapor will condense into liquid.

To provide a high velocity stream of the liquid to be vaporized for passage through the nozzle and into the expansion chamber, it is advantageous to form a rapidly rotating annulus of the liquid. A high velocity stream of liquid is then diverted from the annulus and passed through the nozzle, expansion chamber, compression throat, and vapor separator in accordance with the process of the invention. The stream of unvaporized liquid after separation of entrained vapors therefrom is advantageously returned to the rapidly rotating liquid annulus.

The liberation of gases from liquids in which they are absorbed may be carried out in substantially the same manner as the evaporation procedures referred to above. Advantageously the liquid containing the absorbed gases is subjected to reduced pressure whereby absorbed gases will be released from the liquid; the released gases are then compressed substantially instantaneously in the presence of the liquid and thereafter rapidly separated from the liquid.

The apparatus, which is particularly suitable for carrying out the process described, comprises, in general, a nozzle, an expansion chamber communicating with the nozzle, and a throat portion connecting the expansion chamber with a vapor-separating chamber which is provided with means for the rapid separation of entrained vapors from liquids.

Several embodiments of the apparatus for carrying out the process of the invention as well as the application of this apparatus and the process of this invention to refrigeration cycles and to the concentration of a liquid containing dissolved solids are illustrated in the accompanying drawings, in which—

Fig. 1 is an elevation in section, and Fig. 2 is a plan view in section along the line 2—2 of Fig. 1, of an apparatus comprising a nozzle, an expansion chamber, a compression throat, and a vapor-separating chamber;

Fig. 3 is an elevation in section, and Fig. 4 is a plan view in section along line 4—4 of Fig. 3, of a modification of the apparatus illustrated by Figs. 1 and 2, in which the vapor-separating chamber is cylindrical in form;

Figs. 5 and 6 illustrate the use of the apparatus of Figs. 1 and 2 in connection with a device having a rotatable shell within which an annulus of liquid moving at high velocity may be formed, Fig. 5 being a plan view in section and Fig. 6 being an elevation in section of the device;

Fig. 7 is an elevation in section, and Fig. 8 a plan view in section along the line 8—8 of Fig. 7, of a modified vapor-separating chamber in the form of a rotatably-mounted shell;

Fig. 9 illustrates the application of the apparatus of Figs. 7 and 8 to a refrigeration cycle;

Fig. 10 illustrates in a schematic fashion the application of the process of the invention to the concentration of liquids containing dissolved or suspended solids;

Fig. 11 illustrates the practice of the process in connection with the device illustrated by Figs. 5 and 6; and Fig. 12 illustrates the application of apparatus somewhat similar to that shown in Figs. 1 and 2 to a refrigeration cycle.

In practicing the process of the invention with the apparatus illustrated by Figs. 1 and 2, a high velocity or high pressure stream of liquid passing through the pipe 10 discharges from the nozzle 11 into expansion chamber 12 where a low pressure area will be created. In this area a part of the liquid will flash into vapor because the liquid admitted at 10 is near the vaporization temperature corresponding to the pressure in the expansion chamber 12. The vapor thus formed is carried out of the chamber 12 by the stream of liquid as rapidly as it is formed. In passing through the expansion chamber 12 and into the compression throat 14 the stream of liquid will compress and entrain vapors formed in the expansion chamber and carry them into the vapor-separating chamber 13. The vapors are compressed in the throat 14 because the pressure is higher in the throat than in the chamber 12. The velocity of the stream is lower in the throat than in the chamber 12 and therefore the velocity energy of the stream is transformed into pressure energy in passing from the chamber 12 into throat 14. The vapor-separating chamber is provided with a curved wall 15 along which the stream of liquid passes and ultimately leaves the device by the outlet 16. The passage of the stream of liquid along the curved wall 15 results in the creation of centrifugal force which will facilitate the rapid liberation of entrained vapors from the stream of liquid. To aid in conducting the liberated vapors away from the stream of liquid the separating chamber is provided with fins or vanes 17 which divert the vapors toward the vapor outlet 18.

The expansion chamber 12 of the apparatus just described is provided with an inlet 19 through which noncondensable vapors may be introduced if desired. The introduction of such gases into the expansion chamber and their entrainment by the stream of liquid flowing therethrough in some instances facilitates the subsequent rapid separation of the vapors of the liquid to be evaporated from the stream of liquid by reducing the velocity of condensation or absorption. The non-condensable vapors hinder condensation or absorption by forming a film at the liquid vapor interface at which condensation or absorption occurs. The vapors, which are being absorbed or condensed, must then diffuse through this film.

In practicing the process of the invention with the apparatus illustrated by Figs. 3 and 4, a high pressure or high velocity stream of liquid enters the pipe 25 and discharges from nozzle 26 into expansion chamber 27 which is provided with an inlet 35 for introducing non-condensable gases, if desired. The low pressure area created in the expansion chamber will result in the vaporization of at least a part of the liquid and the passage of the stream of liquid through this chamber and into the compression throat 29 will compress and entrain these vapors and carry them into the cylindrical separating chamber 33. The communication between this chamber and the compression throat 29 is such that the liquid enters the separating chamber tangentially. Advantageously the liquid enters near the top of the chamber in an inclined path, so that the passage of the liquid along the walls of the circular separating chamber will describe a helix as the liquid descends to the bottom of the chamber and ultimately leaves through the outlet 30. The cylindrical construction of the separating chamber results in the creation of centrifugal force when liquid is passed therethrough and the cylinder acts as a "cyclone" or centrifugal separator. The action of the centrifugal force on the stream of liquid passing through the separator aids the liberation of the entrained vapors. To facilitate the separation of these vapors from the main body of liquid the separating chamber is advantageously provided with fins or vanes 31 which are spaced roughly parallel to the cylindrical wall of the separating chamber. These vanes deflect the vapors away from the stream of liquid toward the center of the chamber where the vapors may leave through the outlet 32.

In the operation of the device of Figs. 5 and 6 a rotatably mounted cylindrical shell 40 containing the liquid to be evaporated, or a mixture of a propelling liquid and the liquid to be evaporated, is rapidly rotated with the result that the liquid will be formed into a rotating annulus traveling at high velocity. A stream of liquid is diverted from this annulus by the inlet pipe 42 and passed through the nozzle 43 into expansion chamber 44. Here a part of the liquid will flash into vapor. The vapor will be compressed and entrained by the stream of liquid flowing through the expansion chamber 44 and compression throat 46 and will be rapidly separated from the liquid in the vapor-separating chamber 45. In this chamber the centrifugal force created because of the passage of the liquid along the curved wall 47 causes the entrained vapors to be liberated and they are deflected away from the liquid stream by the fins or vanes 48. The vapors are discharged through the outlet 49. The rapidly moving stream of liquid is discharged through the outlet 50 and falls back into the body of liquid in the rotating annulus. Liquid is introduced into the rotating shell through conduit 51 and excess liquid, if any, may be withdrawn by conduit 52.

In practicing the process of the invention with the apparatus illustrated in Figs. 7 and 8, a high velocity or high pressure stream of liquid enters the device through conduit 55 and after passing through a nozzle 53, expansion chamber 54, and a compression throat 56 is discharged through the outlet 57 into the cylindrical separating chamber 58. This chamber is rotatably mounted and is provided with fins 59. Liquid emerging from the outlet 57 impinges on these fins causing the chamber 58 to rotate. The centrifugal force which is developed throws the liquid against the wall of the chamber and thereby brings about a rapid separation of the liquid and entrained vapor. The separation of the vapor from the liquid may be facilitated by means of fins arranged in the same manner as those illustrated by the devices shown in Figs. 1 to 4 inclusive. The apparatus is provided with a discharge conduit 60 which maintains a constant level of liquid within the shell. The separated vapors leave the apparatus through conduit 61.

The use of the device just described in connection with a refrigeration cycle in which a relatively non-volatile propellant liquid is used as a carrier for the liquid to be evaporated is illustrated, more or less diagrammatically by Fig. 9. In the operation of the refrigeration cycle a propellant liquid and the liquid to be evaporated pass from the tank 70 which is provided with an agitator 71 into a pump 72 which raises the hydrostatic pressure of the liquid before it is introduced into the separating shell 73. The construction of this shell is the same as that illustrated by Figs. 7 and 8. Vapors from the separating shell enter the condenser 74 and the vapors condensed therein are returned to the tank 70. The propellant liquid which has been cooled in the separating chamber 73 by the evaporation of the volatilizable liquid with which it was initially admixed flows through the refrigerating element 75 where it absorbs heat and is then returned to the tank 70. The separating shell 73 is mounted on a shaft 76 supported on a bearing member 77. The energy of rotation of the separating shell 73 may be regained by connecting the shaft 76 to a generator (not shown) or to the drive shaft of the pump 72. If the latter expedient is adopted extra energy must be supplied to the pump. In order to regain the maximum energy of motion of the propellant liquid it is advantageous to hold the refrigerating element 75 and tank 70 under elevated pressure. In this case it will be desirable to use a pump (not shown) for transferring the condensate from condenser 74 into tank 70.

The application of the process of the invention to the evaporation or concentration of solutions such as sodium hydroxide solution is illustrated schematically by Fig. 10. The solution to be evaporated, such as, for example, a sodium hydroxide solution containing 8 parts by weight of sodium hydroxide and 100 parts by weight of water, enters tank 80 through the pipe 81. In this tank it is mixed with a propellant liquid such as "straw oil," which has an initial boiling point of 530° F. at one atmosphere. The resulting mixture flows through the pipe 82 into the pump 83 and through the heat exchangers 84 and 85 into a nozzle, expansion chamber, compression throat, and vapor-separating chamber unit 86, such as is illustrated by Figs. 3 and 4. The liquid entering the nozzle is at a temperature of about 167° F. and at a pressure of about 50 pounds per square inch absolute. The vapor pressure of a solution containing 40 parts of sodium hydroxide per 100 parts of water is approximately 135 mm. absolute at 167° F. After passing through the nozzle and into the expansion chamber some of the water in the sodium hydroxide solution flashes to steam because the pressure in this chamber is less than 134 mm. The mixture of steam and liquid then flows into the vapor-separating chamber of the unit 86 which is under one atmosphere total pressure. The steam leaves by conduit 88 and flows into heat exchanger 84 where it condenses at 212° F. and imparts its heat to the stream of liquid flowing therethrough. Make-up steam is added to heat exchanger 85 and condensate from that exchanger and from heat exchanger 84 is recovered by means of conduit 90. Any small amounts of the straw oil in the steam may be recovered by decantation. The evaporated sodium hydroxide solution which is at a concentration of about 40 parts of sodium hydroxide per 100 parts of water and at a temperature below 212° F. is discharged from the vapor-separating chamber 86 together with the propellant liquid through the conduit 91. The mixture of the two liquids is discharged into a decanter 92 in which the heavy concentrated solution of sodium hydroxide is withdrawn at 93; the lighter straw oil rises to the top and is drawn off through pipe 94 and discharged into tank 80 where it repeats the cycle. Sometimes it may be desirable to recirculate some of the concentrated solution with the straw oil and in that case it is drawn through conduit 95 and valve 96 into tank 80.

The application of the process to the concentration of liquids containing dissolved or suspended solids should not be carried to the point where the solvent is completely removed from the solids unless some relatively non-volatile propellant liquid is employed in association with the solvent. The concentration may, however, advantageously be carried to the stage where the volatilizable liquid and associated solids are in the form of a heavy slurry, even though no propellant liquid is present.

The application of the process to the evaporation of a liquid, such as methylene chloride, in a refrigeration cycle in conjunction with the apparatus illustrated by Figs. 5 and 6 is shown in more or less schematic fashion by Fig. 11. A mixture containing about 90% water and 10% methylene chloride is introduced into a rotatable cylindrical shell 100 such as is illustrated by Figs. 5 and 6. This shell, as shown in these figures, is provided with the device illustrated by Figs. 1 and 2. The rotation of the shell results in the formation of the mixture of methylene chloride and water into a rapidly rotating liquid annulus. A stream of liquid is diverted from this annulus and passed through a nozzle into an expansion chamber, as shown in Figs. 5 and 6. The methylene chloride will flash into vapor in the expansion chamber which is at a pressure lower than the boiling point of methylene chloride at the temperature prevailing there and the vapors formed will be compressed to a pressure greater than the condensation pressure at that temperature, and entrained by the stream of liquid and will subsequently be rapidly separated from the liquid in the separation chamber of the device. The vapors will leave the rotating shell through conduit 101 and will be passed through a condenser 102. The liquid leaving the condenser is returned to the shell by means of conduits 103 and 104. The liquid in the shell will be cooled by the evaporation of the methylene chloride and this cooled liquid is withdrawn from the shell by conduit 105 and is circulated through a refrigerating coil 106 where it will be reheated. It is then returned to the shell by means of conduit 104.

In the refrigeration cycle illustrated by Fig. 12 a stream of propellant liquid is forced by the pump 110 through a pipe 111 and into nozzle 112 from which it is discharged into an expansion chamber 113. The expansion chamber is filled with vapors of a low boiling liquid suitable as a refrigerant. These vapors are entrained by the stream of propellant liquid emerging from the nozzle 112 and are compressed by the latter liquid when it passes through the compression throat 114. The mixture of propellant liquid and entrained gas is then conducted to a vapor separating chamber 115 similar to that shown in Figs. 1 and 2 where the entrained gases are rapidly separated from the propellant liquid and diverted by the vanes 116 to the vapor outlet 117. The propellant liquid leaves the separating chamber at 118 and returns to the pump 110. The vapors emerging from the separating chamber are passed through the condenser 120 and the liquid formed therein is passed through the expansion valve 121 and into the refrigerating coils 122. The vapor leaving the refrigerating coils is conducted by means of conduit 123 back into the expansion chamber 113.

An illustration of the use of the process of this invention in recovering absorbed gases from liquids is the removal of hydrogen sulfide from a sodium bicarbonate solution in which it has been absorbed. Such bicarbonate solutions are produced in the removal of traces of hydrogen sulfide from coal or water gas by treating the latter with a sodium carbonate solution. The solutiton at atmospheric pressure will absorb a certain quantity of hydrogen sulfide. Such a solutiton, if subjected to a reduction in pressure, will liberate hydrogen sulfide. If the liberated gas is then compressed substantially instantaneously in the presence of the liquid and thereafter rapidly separated from the liquid in accordance with the process of this invention, the hydrogen sulfide may be readily recovered from the originally saturated solution. The process may advantageously be conducted by passing the saturated solution through an apparatus such as is described in this application.

I claim:

1. The process of evaporating liquids which comprises reducing the pressure on a stream of the liquid while the liquid is at such a temperature that the reduction in pressure causes at least a part of the liquid to flash into vapor, substantially instantaneously compressing said vapor in the stream of liquid above the condensation pressure of the vapor at the prevailing temperature but without substantial condensation of the vapor, and thereafter immediately separating the vapor from the liquid before substantial condensation of the vapor occurs.

2. The process of evaporating liquids which comprises reducing the pressure on a high velocity stream of the liquid while the liquid is at such a temperature that the reduction in pressure causes at least a part of the liquid to flash into vapor, substantially instantaneously compressing the vapor in the stream of unvaporized liquid and entraining it in said stream, and thereafter immediately separating said entrained vapor from the unvaporized liquid.

3. The process of evaporating liquids which comprises reducing the pressure on a high velocity stream of said liquid whereby at least a part of the liquid will flash into vapor, compressing said vapor substantially instantaneously and entraining it in a stream of unvaporized liquid and thereafter and substantially instantaneously separating the entrained vapor from the unvaporized liquid by the action of centrifugal force.

4. The process of evaporating liquids which comprises mixing the liquid to be evaporated with a relatively non-volatile propellant liquid, projecting the liquid mixture in a high velocity stream, reducing the pressure on the high velocity stream of said liquid mixture whereby at least a part of the liquid to be evaporated will flash into vapor, compressing said vapor substantially instantaneously and entraining it in the stream of unvaporized liquid, and thereafter substantially instantaneously separating the entrained vapor from the unvaporized liquid.

5. The process of evaporating liquids which comprises mixing the liquid to be vaporized with a relatively non-volatile propellant liquid, projecting the liquid mixture in a high velocity stream, reducing the pressure on the stream of said liquid mixture whereby at least part of the liquid to be evaporated will flash into vapor, compressing said vapor substantially instantaneously and entraining it in the stream of unvaporized liquid and thereafter and substantially instantaneously separating the entrained vapor from the unvaporized liquid by the action of centrifugal force.

6. The process of recovering absorbed gases from liquids which comprises reducing the pressure on said liquid whereby absorbed gases will be released from said liquid, compressing said released gases substantially instantaneously in the presence of said liquid, and thereafter substantially instantaneously separating said released gases from said liquid by centrifugal force.

7. The process of evaporating liquids which comprises forming a rotating annulus of the liquid traveling at a high velocity, diverting a stream of liquid from said rotating liquid annulus and thereafter reducing the pressure on said stream whereby at least a part of the liquid will flash into vapor, compressing said vapor substantially instantaneously and entraining it in a stream of unvaporized liquid, and thereafter subjecting the stream of liquid and entrained vapor to the action of centrifugal force whereby the vapor will be rapidly separated from the liquid.

BENJAMIN CLARK BOECKELER.